United States Patent [19]
Stana

[11] Patent Number: 5,622,341
[45] Date of Patent: Apr. 22, 1997

[54] FIXING DEVICE FOR SECURING CONDUITS TO SUPPORT STRUCTURES

[75] Inventor: Nils A. Stana, Egersund, Norway

[73] Assignee: Ing. Finn Christensen A.S., Oslo, Norway

[21] Appl. No.: 387,865

[22] PCT Filed: Aug. 24, 1993

[86] PCT No.: PCT/NO93/00130

§ 371 Date: Feb. 24, 1995

§ 102(e) Date: Feb. 24, 1995

[87] PCT Pub. No.: WO94/04861

PCT Pub. Date: Mar. 3, 1994

[30] Foreign Application Priority Data

Aug. 25, 1992 [NO] Norway ................................. 923316
Apr. 20, 1993 [NO] Norway ................................. 931454

[51] Int. Cl.$^6$ ........................................................ F16L 3/00
[52] U.S. Cl. ...................... 248/74.1; 248/73; 248/221.11; 248/222.12; 248/229.11; 248/316.5
[58] Field of Search ................................ 248/68.1, 74.1, 248/73, 221.11, 222.11, 222.12, 229.11, 229.21, 230.4, 231.31, 316.1, 316.5; 24/285

[56] References Cited

U.S. PATENT DOCUMENTS

| | | | |
|---|---|---|---|
| 2,179,406 | 11/1939 | Fitzpatrick | 248/68.1 |
| 3,640,497 | 2/1972 | Waki | 248/222.12 X |
| 4,099,626 | 7/1978 | Magnussen, Jr. | 248/68.1 X |
| 4,176,817 | 12/1979 | Jones | 248/316.2 X |
| 4,730,800 | 3/1988 | Engman | 248/74.1 X |
| 5,024,405 | 6/1991 | McGuire | 248/74.1 X |
| 5,305,978 | 4/1994 | Current | 248/230.4 |

FOREIGN PATENT DOCUMENTS

| | | | |
|---|---|---|---|
| 125821 | 11/1984 | European Pat. Off. | |
| 148610 | 7/1985 | European Pat. Off. | |
| 2633442 | 1/1978 | Germany | |
| 2505628 | 8/1978 | Germany | 248/74.1 |
| 3511265 | 10/1986 | Germany | |
| 450037 | 6/1987 | Sweden | |
| 1322924 | 7/1973 | United Kingdom | |
| 2049019 | 12/1980 | United Kingdom | 248/68.1 |
| 2117483 | 10/1983 | United Kingdom | |

*Primary Examiner*—Ramon O. Ramirez
*Assistant Examiner*—Brian J. Hamilla
*Attorney, Agent, or Firm*—Cushman Darby & Cushman IP Group of Pillsbury Madison & Sutro LLP

[57] ABSTRACT

A fixing device for securing an elongate article such as a conduit to a support structure such as a wall of a cableway or cable riser, includes a housing provided with opposed hooks for securing the housing to the support structure by relative movement and then locking in place of the hooks. After the housing is mounted, the elongate article can be received in a U-shaped jaw provided on the housing, and a ratchet arm pivoted and latched to the housing, around the elongate article, trapping the elongate article in the jaw. Freeing the elongate article and dismounting the fixing device involve a reversal of these steps.

19 Claims, 11 Drawing Sheets

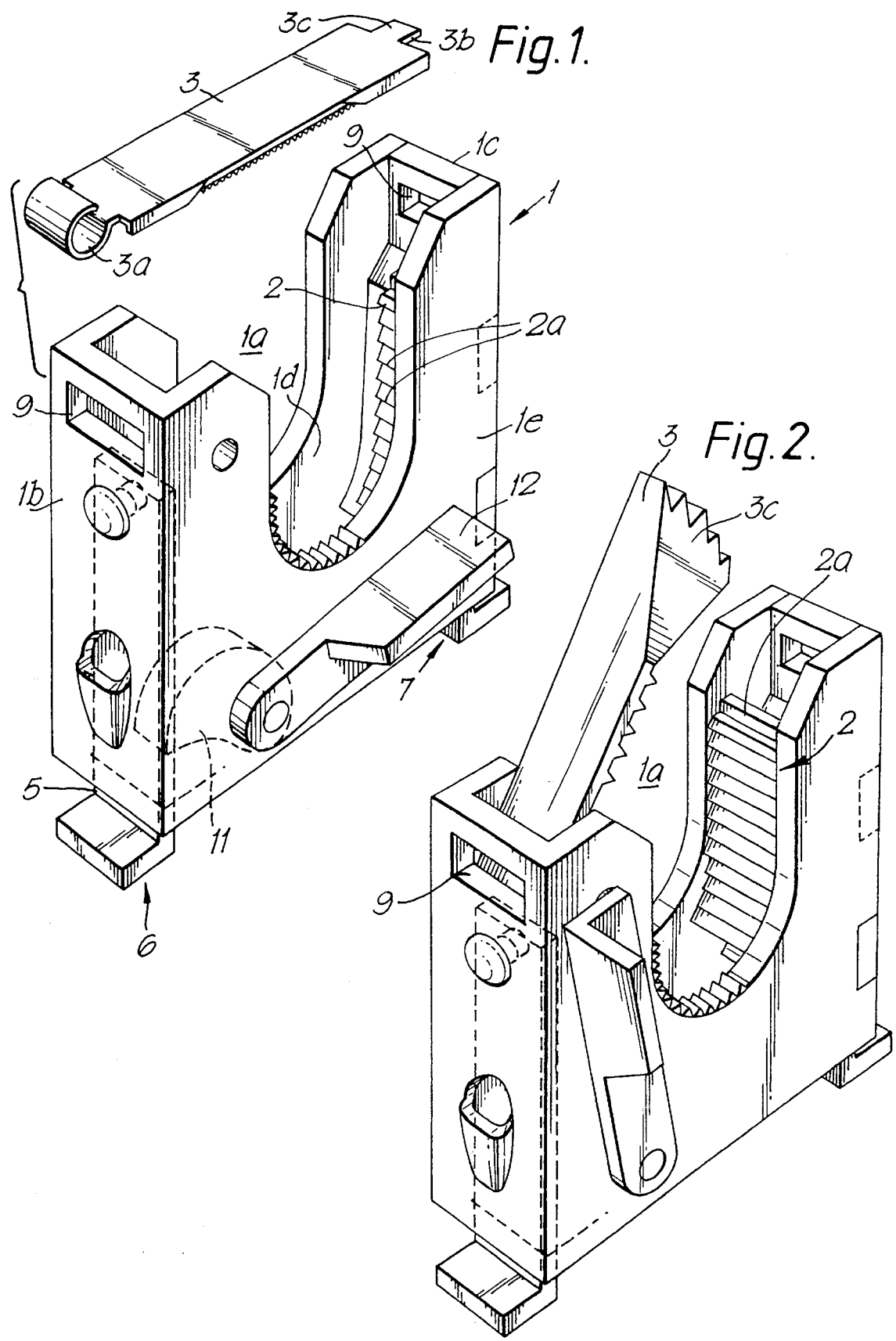

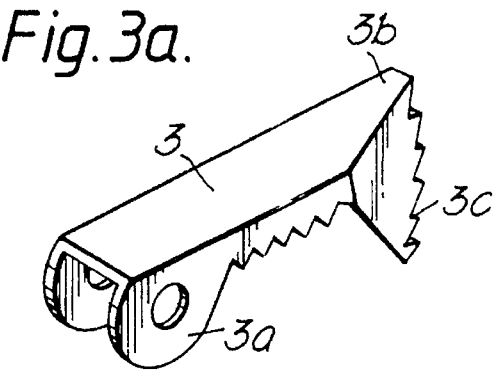
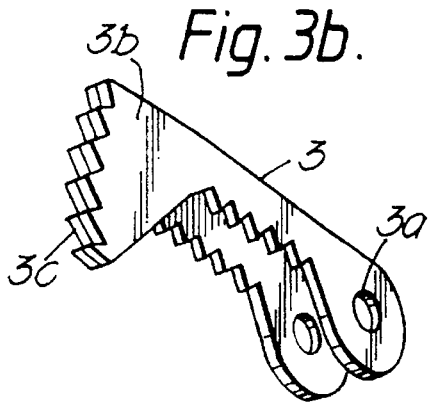
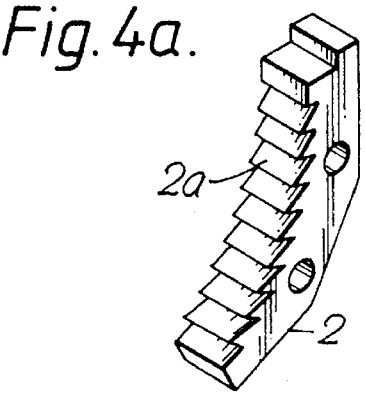
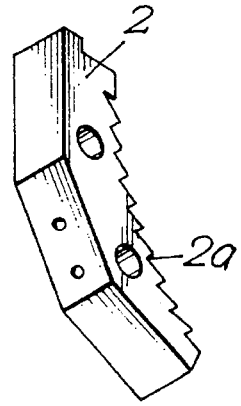
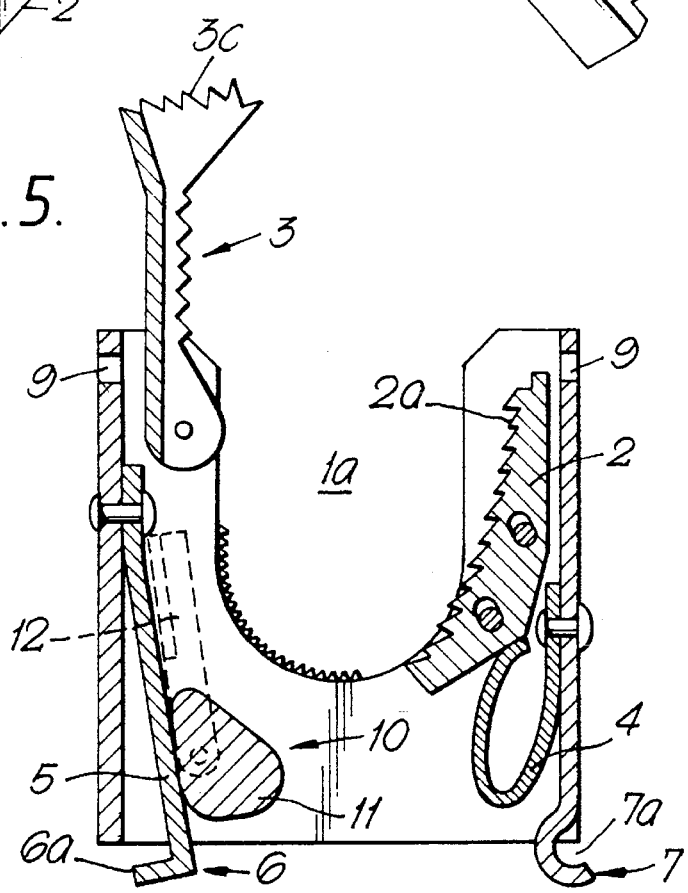

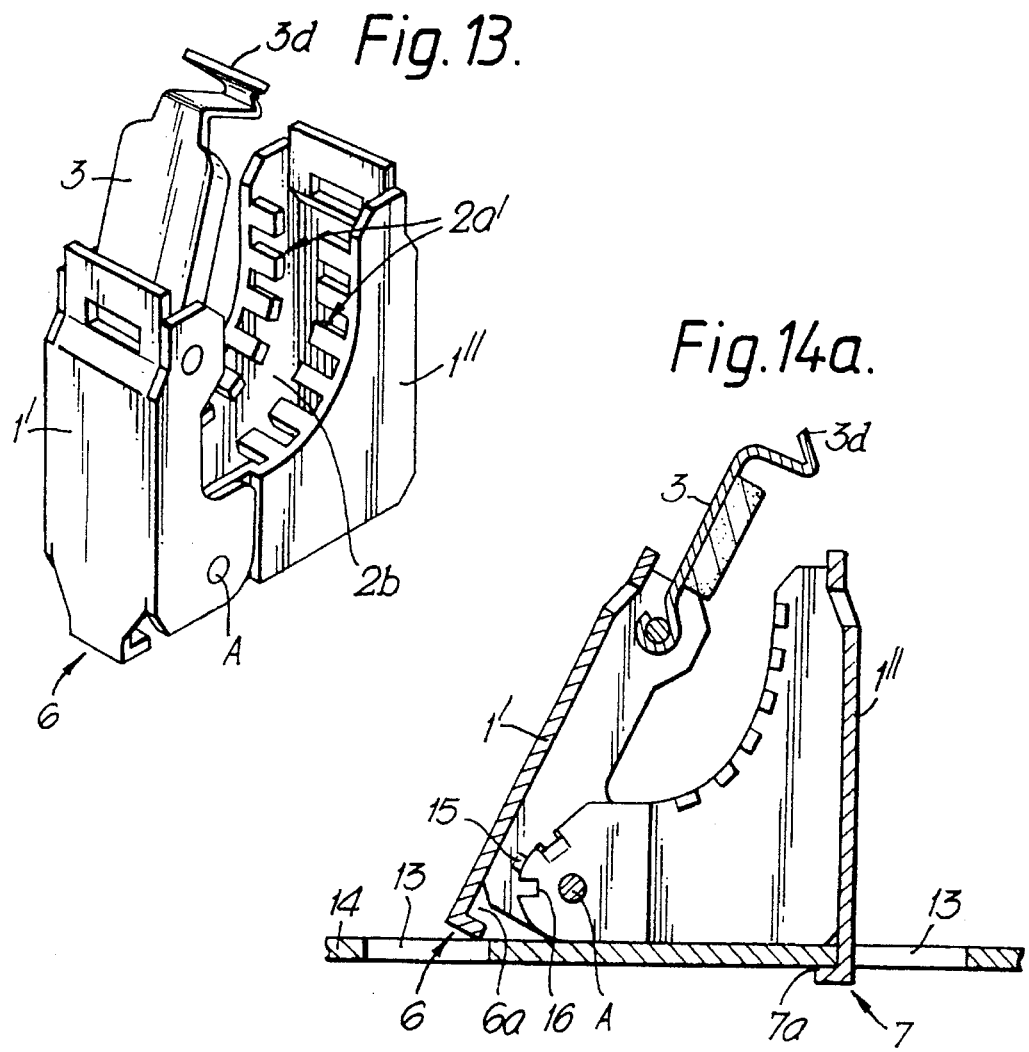
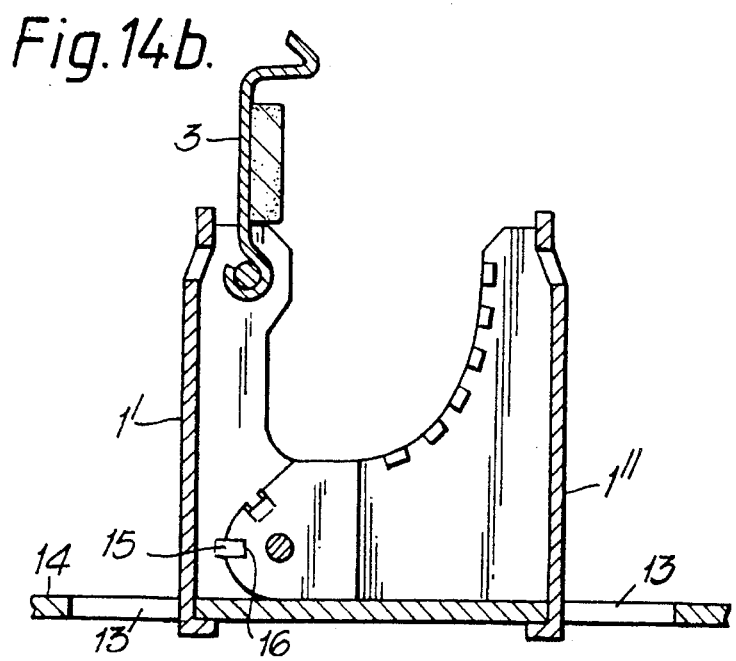

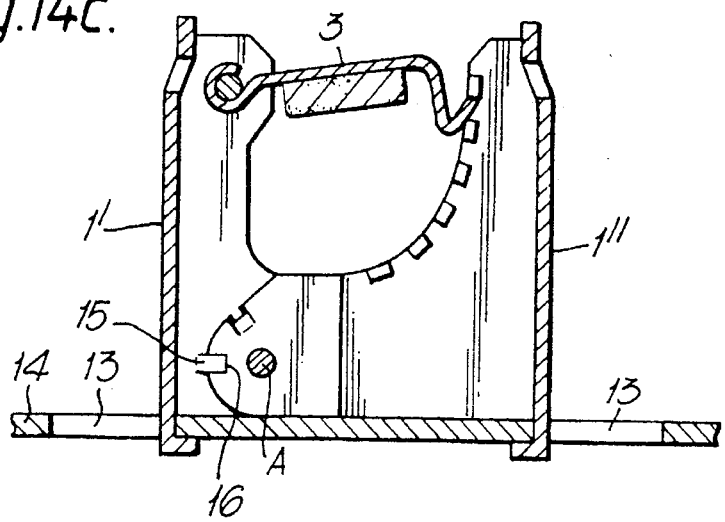
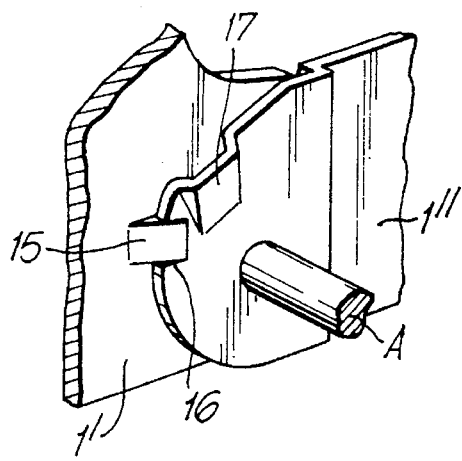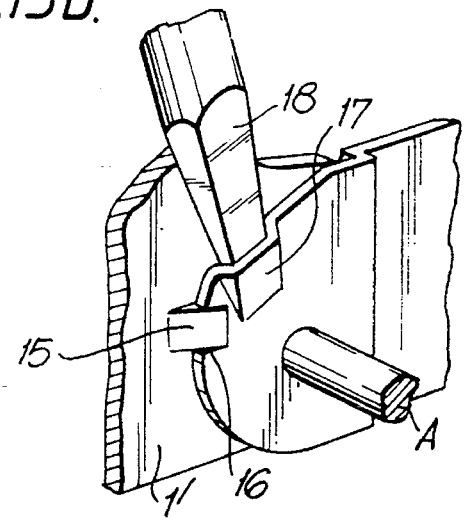
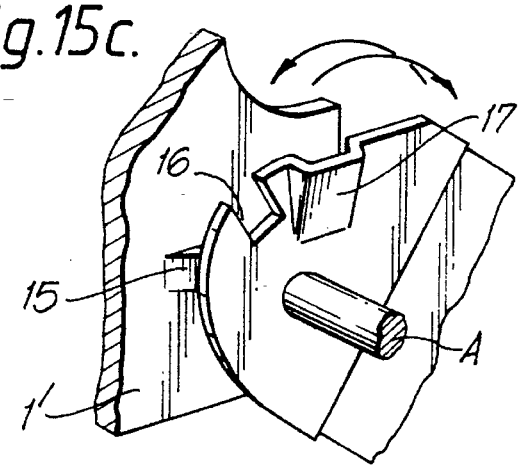

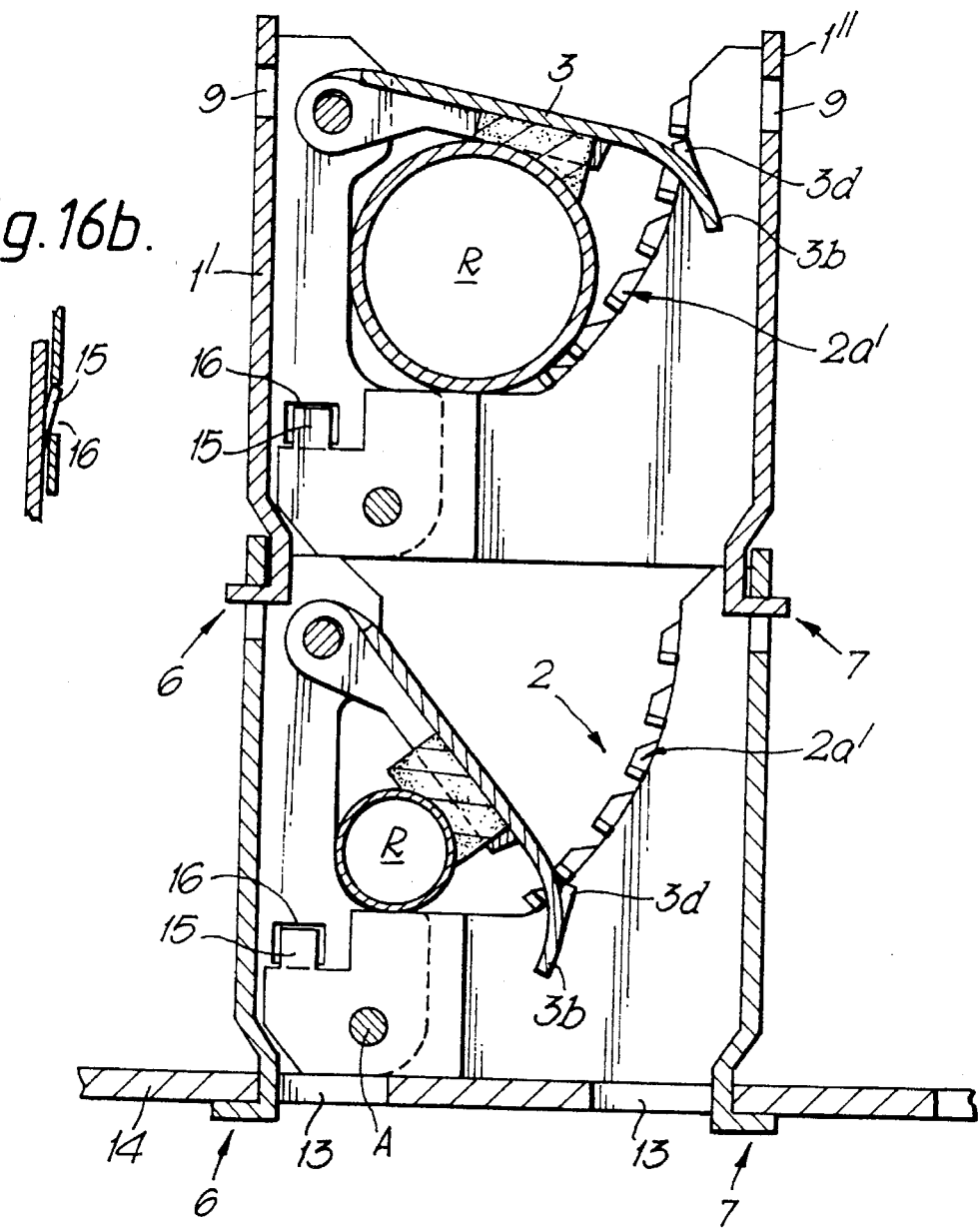

FIXING DEVICE FOR SECURING CONDUITS TO SUPPORT STRUCTURES

BACKGROUND OF THE INVENTION

The present invention relates to a fixing device for securing elongate articles, such as conduits, to support structures, in particular cableways/cable risers.

When mounting elongate articles such as conduits on underlying support structures such as cableways and cable risers, in structures at sea and on land, the conduits are secured and held in place by means of conduit clamps. In their simplest form, such clamps consist of a u-shaped body attached by the side edge at the bottom of the U-opening to the support structure by means of screws and nuts or by means of hooks which are brought into engagement with holes, slots or edges in the support structure.

Conduit clamps of this kind ought to be easy to mount to the underlying support structure and also ought to be easy to release to enable a change in position or the removal of the clamps to be carried out during the relaying of pipelines or the moving thereof, and optionally for installing cables which require other fixing devices.

SUMMARY OF THE INVENTION

The objective of the present invention is thus to provide a fixing device in the form of a clamp which firstly can easily be adapted to different conduit dimensions and where the securement and release of the conduit are such that the objective of providing a clamp which is easy to mount on the support structure and is also easy to dismount therefrom is attained.

BRIEF DESCRIPTION OF THE DRAWINGS

The invention will be explained in more detail hereinbelow with reference to the attached drawings which illustrate an exemplary embodiments of the fixing device according to the invention and which also show how the device is mounted and how the conduit is positioned in the clamp of the fixing device.

Reference is now made to the drawing wherein:

FIG. 1 is a perspective view of a first embodiment of the fixing device seen at an angle from above with the jaw and the ratchet arm taken apart from one another and with the resilient movable attaching member locked in the engagement position by means of an eccentric member turned to the closure position by means of an operating arm, the operating arm also being indicated in dotted lines with the eccentric member in the passive position.

FIG. 2 shows the same embodiment as FIG. 1 albeit with a different design of ratchet arm, with the ratchet arm mounted in the passive position and operating arm in the upwardly pivoted passive position.

FIGS. 3a and 3b illustrate the FIG. 2 embodiment of the ratchet arm in perspective seen from above and below, respectively.

FIGS. 4a and 4b perspective views of the locking member seen looking towards the locking teeth and seen from behind.

FIG. 5 depicts the clamp of the fixing device in section seen looking towards the main surface of the clamp and the clamp opening and with the ratchet arm and operating arm of the attaching member in passive positions.

FIG. 7a the fixing device in perspective in the passive position ready for mounting onto the cableway, FIG. 7b the fixing device mounted by means of attaching members in slots in the cableway and with the operating arm in its upper, passive position, but about to be pivoted down to hold the first attaching member in the form of a hook in engagement with an edge of a slot while the second attaching member, in the form of a hook, is in engagement (not shown) with the edge of a second slot parallel to and spaced apart from the first slot, FIG. 7c the fixing device mounted and a conduit placed therein and with the ratchet arm in the passive position, FIG. 7d the same as FIG. 7c, but with the ratchet arm in the active position for retaining the conduit, and FIG. 7e a further fixing device mounted on top of the first fixing device secured to the cableway, the attaching members of the second fixing device being brought into engagement with the holes an each side of the mouth of the clamp opening.

FIG. 12a shows the jaw portions rotated apart from one another for the insertion of attaching members in apertures in the underlying support structure, FIG. 12b shows the jaw portions rotated into the operative position with the attaching members in engagement with apertures in the underlying support structure, FIG. 12c illustrates the fixing device in the operative position with the conduit of the largest dimension that can be used with the fixing device held in place, and FIG. 12d shows the same but with a conduit of the smallest dimension that can be retained in the fixing device.

FIG. 13 illustrates a further embodiment of the fixing device, in perspective, as in FIG. 10, but here the clamps of the fixing device have inwardly hook-shaped attaching members in contrast to the outwardly hook-shaped attaching members in FIG. 10.

FIGS. 14a–c are side views of the fixing device according to FIG. 13, in section, and where:

FIG. 14a shows the jaw portions rotated towards one another for the insertion of the attaching members of the fixing device into apertures in the underlying support structure, FIG. 14b shows the same with the jaw portions rotated into the operative position and with the attaching members in engagement with the edges of the apertures, and FIG. 14c shows the same as FIG. 14b, but with the ratchet arm in engagement with the appurtenant locking member, FIGS. 15a–c illustrate details, on a larger scale, of the clamping members with which the jaw portions are provided in order to hold the jaws in the operative position after the fixing device is attached on the underlying support structure, and FIGS. 16a and 16b respectively show two fixing devices mounted one on top of the other with the lowermost fixing device mounted on an underlying support structure, and enlarged details of the clamping members with which the two jaw portions of the fixing device are provided.

DETAILED DESCRIPTION

Figure 6:
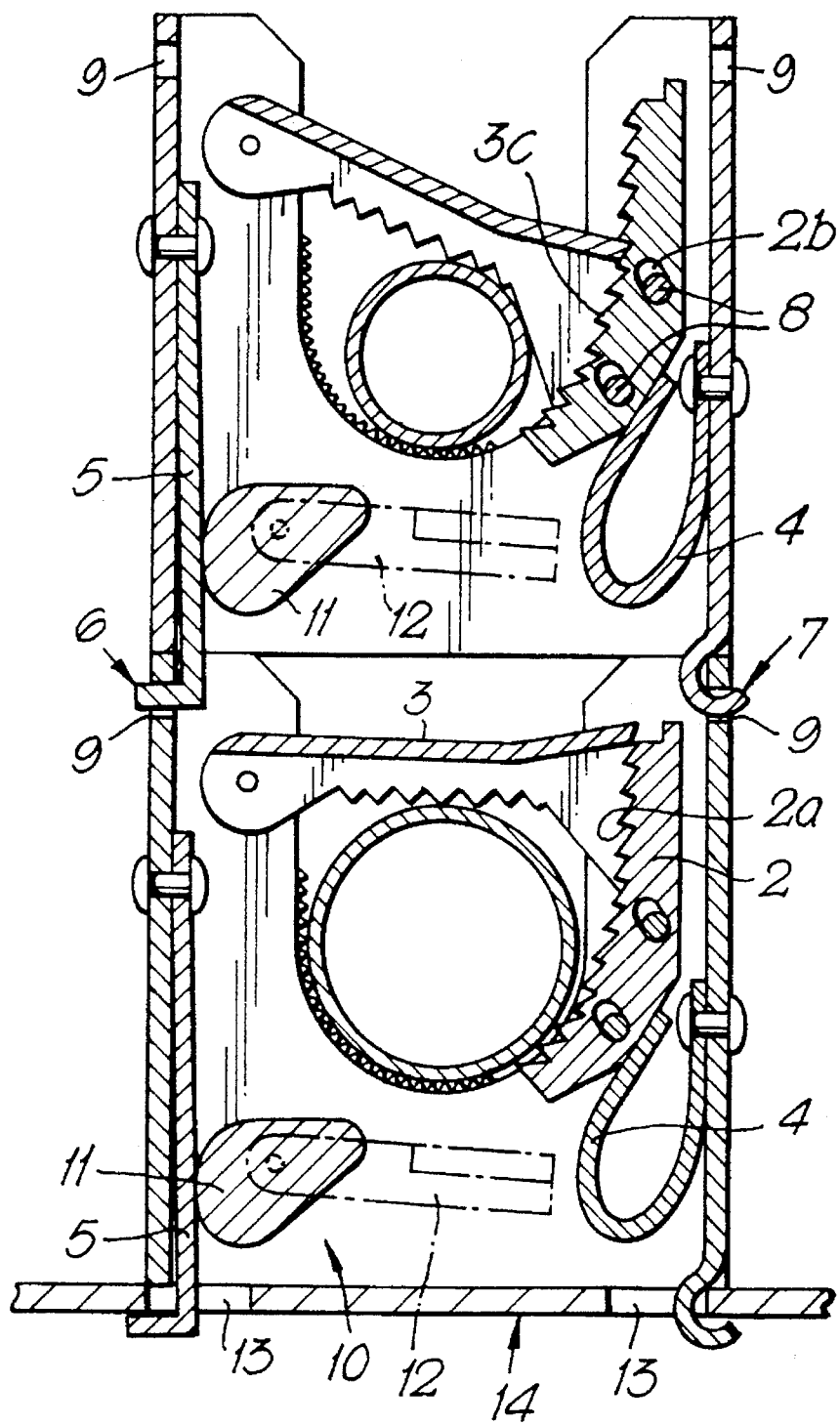
FIG. 6 illustrates the fixing device mounted on an underlying support structure in the form of a cableway, a fragment of which being shown in cross-section, with the operating arm in the active position and with the conduit positioned in the clamp opening and with the ratchet arm in the active position for retaining the conduit, and also a further fixing device mounted on top of the first fixing device with a conduit placed therein that is of smaller dimension than the first-mentioned conduit and with the ratchet arm in a second active retaining position.

FIG. 1 shows, as stated above an embodiment of, the fixing device, hereafter in the specification referred to as the clamp, in perspective, and comprising a jaw 1 in the form of a housing with two side walls 1b, 1c which face one another and two walls having a clamp opening 1a which in FIG. 1 are shown in the form of a front wall 1e and a back wall 1d, these walls together forming a housing which in these figure is open in the upwards and downwards direction.

The jaw 1, at its lowermost part in FIG. 1, is provided with attaching members 6,7 for interaction with complementary attaching members in the underlying support structure, such as elongate apertures 13 in a cableway/cable riser 14.

The attaching members 6,7 will be discussed in more detail hereinbelow.

A closure means 2,3 comprises a ratchet arm 3 pivotally mounted at one end 3a to one of the sides of the clamp opening 1a near its mouth. The second end/engaging end 3b of the ratchet arm 3 is designed for snap engagement with a locking member 2 of complementary configuration at the opposite side of the clamp opening 1a for pressing a conduit R into the clamp opening 1a and retaining it therein see FIGS. 6 and 7).

Figure 7A:
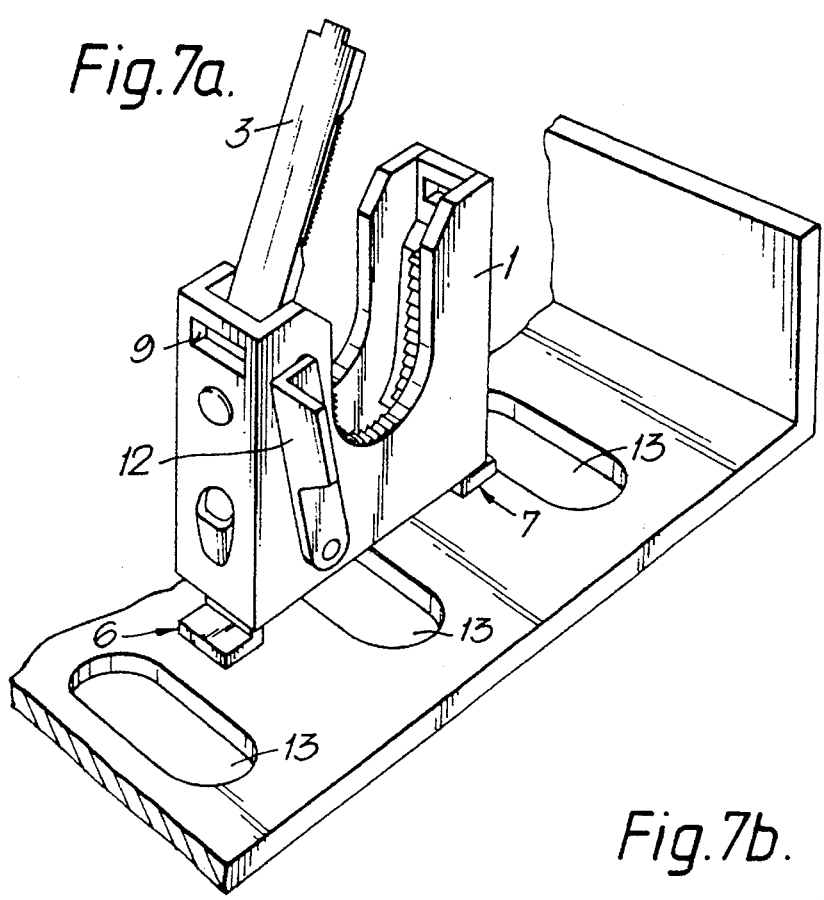
FIGS. 7a, b, c, d and e illustrate as follows.
Figure 7B:
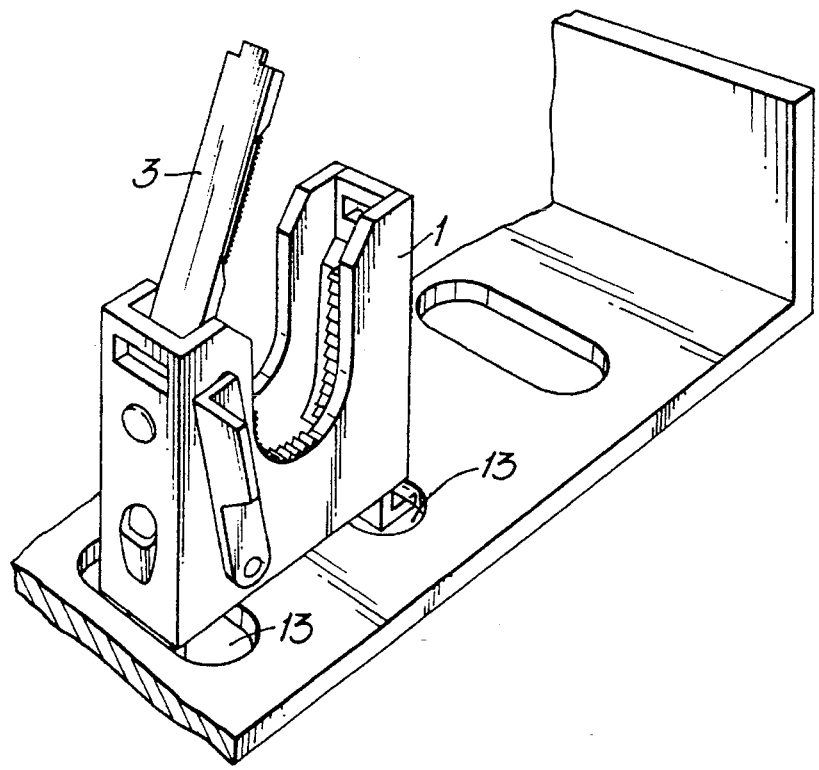
Figure 7C:
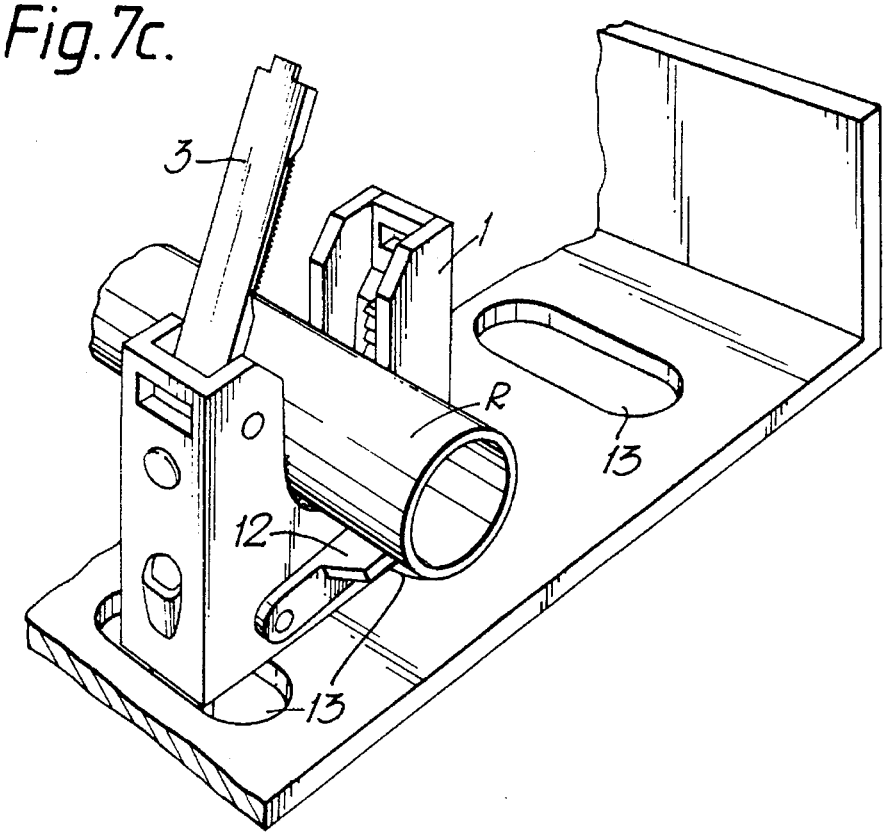
Figure 7D:
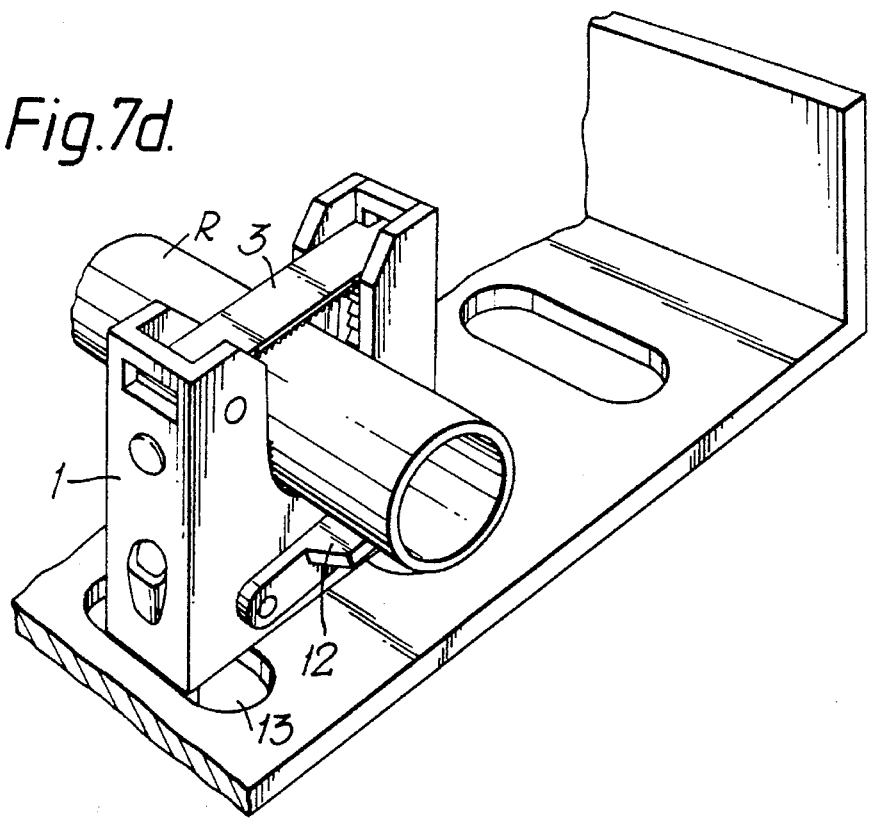

The locking member 2 is arranged so as to be resiliently tensioned in the direction of the clamp opening 1a for resilient abutment against the engaging end 3b of the ratchet arm 3 when in its inwardly pivoted active position, as shown in FIGS. 6 and 7d and e.

The locking member 2 and the engaging end 3b of the ratchet arm 3, in the illustrated embodiment, are designed with a plurality of projections/teeth 2a, 3c for engagement with one another in the desired position, dependent upon the outer dimension of the conduit R, as is shown clearly in FIGS. 2 and 6.

To guide the locking member 2 in its resilient movement towards the engaging end 3b of the ratchet arm 3, the locking member 2, which in the present embodiment and as shown in FIG. 4, has the form of a curved body having teeth 2a on its concave side, is equipped with two parallel, elongate guiding slots 2b, spaced apart from one another in the side surfaces of the locking member 2, which are through-going and are designed to interact with two guiding pins 8 secured in the front wall 1e and the back wall 1d of the jaw 1. The guiding pins 8 and the guiding slots 2b are positioned and oriented in such a way that by means of a locking spring 4 in the form of a bent laminated spring attached to one side wall 1c and the jaw 1 and to the locking member, respectively, the locking member can be moved/pressed in the direction towards the engaging end 3b of the ratchet arm 3 in its inwardly pivoted closure position (see FIGS. 4, 5 and 6).

The aforementioned attaching members 6,7 of the conduit jaw are arranged on the side 1b of the jaw 1 opposite the mouth of the clamp opening 1a and comprise projecting hooks 6,7 with hook openings 6a, 7a facing either towards and or away from one another for engagement with complementary attaching members in the underlying support structure, for example edges in elongate apertures 13 in the cableway/cable riser 14 as shown in FIGS. 6 7a–7d.

When the hook openings 6a, 7a face away from one another and and are secured either end of the side of the jaw 1 opposite the mouth of the clamp opening 1a, ie, in FIGS. 6, and 7a–7d the lowermost open side edge of the jaw 1, the hooks 6,7 of the clamp can be thrust down into the elongate apertures 13 in the cableway with the clamp slightly askew in relation to the apertures 13, whereafter the clamp can be rotated into a position at right angles to the elongate apertures 13 so that the hooks 6,7 engage with the underside of the edges of the aperture 13.

A more expedient design is however shown in the drawings, wherein one hook 6 is provided so as to be resiliently movable so that the clamp can be both mounted onto and dismounted from the attaching members in the underlying support structure, such as the elongate apertures 13.

Such resilient mobility of the hook 6 is obtained in that the hook 6 with a stem 5 consisting of spring steel is secured by the end facing away from the hook 6 to the inside of one of the side walls 1b of the jaw 1.

Providing that the hook 6 with the stem 5 lies resiliently in abutment against the inside of the side wall 1b, the clamp can be mounted in the elongate apertures 13 in that the resilient hook 6 is inserted into the elongate slot 13, whereafter the clamp is displaced with the stem 5 of the hook towards the edge of the slot, whereupon the hook 7 at the other end of the clamp is inserted into a parallel slot 13 and in under the edge thereof while the resilient hook 6 springs back into position.

When using this method of attachment, the clamp can, however, be released unintentionally in that force is exerted upon the clamp which displaces it towards the spring tension of the hook 6 in such a way that the fixed hook 7 can be forced up out of the aperture 13. In order to prevent this, the clamp is equipped with a lock 10 for the hook 6, comprising an eccentric member 11 with operating arm 12, mounted on the jaw 1. The eccentric member 11 can be turned by means of operating arm 12 from the passive position where the hook 6 with stem 5 lies in the withdrawn position as shown in FIG. 5. This will happen provided that the stem 5 of the hook 6 is bent away from the inside of the side wall 1b of the jaw 1.

By pivoting the operating arm 12 downwards, the eccentric member 11 is rotated and presses the stem 5 of the hook 6 in towards the the inside of the side wall 1b, whereupon the hook 6 is swung outwards and into engagement under the side edge of the aperture 13. Thus, the clamp will not be capable of being moved sideways by the pressure of any force and will be securely held against the support structure.

The mounting of the clamp on the cableway and the positioning of the conduit in the clamp is clearly shown in FIGS. 7a, b, c, d and e. The clamp is secured by means of the hooks 6,7 in the aforementioned elongate apertures 13 in the cableway/cable riser 14, whereupon the operating arm 12 is pivoted downwards so that the movable hook 6 is displaced in under the edge of the aperture 13, whereby the clamp is securely fixed to the cableway as shown in FIG. 7b. The conduit R is placed thereafter in the opening of the clamp 1a as shown in FIG. 7c and the ratchet arm 3 is pivoted downwards so that its engaging end 3b, that is provided with teeth 3c, enters into engagement with the locking member 2, as is shown in FIG. 7d. The clamp can receive and retain the conduit R of varying dimensions in that the ratchet arm 3 is depressed to a lesser or greater extent, depending upon the dimensions of the conduit, into engagement with the locking member 2, as is shown in FIG. 6.

Figure 7E:
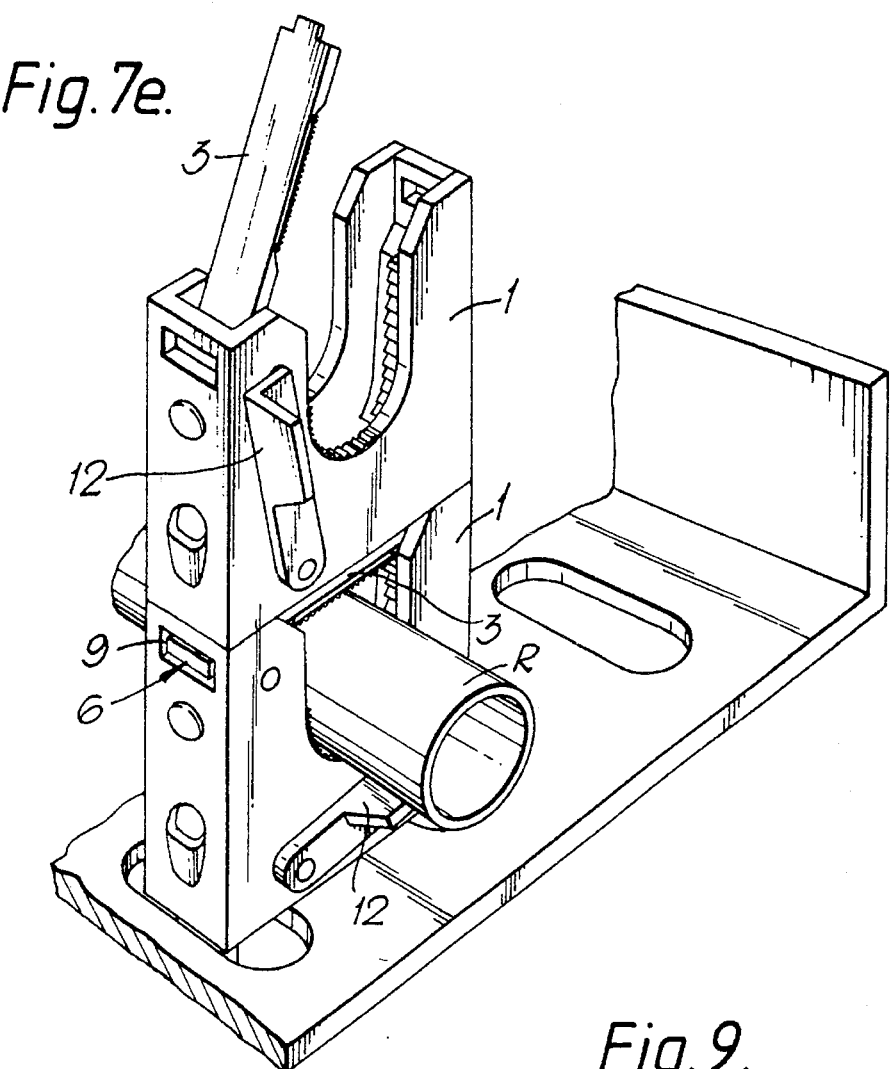

As shown in FIG. 7e, an additional clamp can be placed on top of the clamp that is secured to the cableway 14. The same attaching members 6,7 are used here in interaction with holes 9 in each of oppositely positioned side walls 1b,1c of the jaw.

Figure 8:
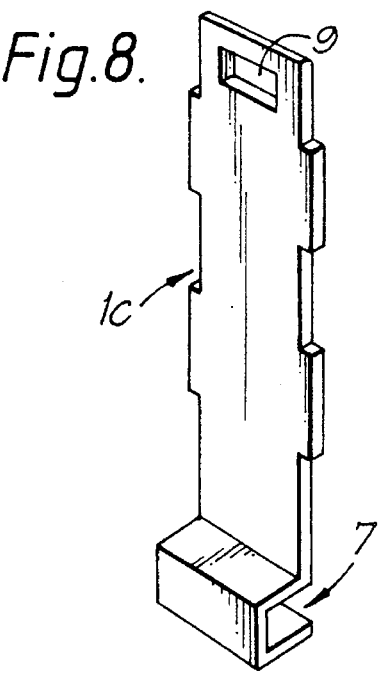
FIG. 8 shows a first embodiment of the side wall element of the jaw of the clamp.

The jaw 1 can be made, for instance, in such a way that a blank is punched out which comprises the front wall 1e, the back wall 1d with the intermediate side wall 1b. The blank is bent upwards so that the front wall, back wall and one side wall are formed. The second side wall 1c can be produced separately, as shown in FIG. 8, and affixed in the open side edge of the upwardly bent blank in a known way, per se. The side wall element 1c is, as shown in FIG. 8, equipped with the hook 6 at its lowermost end and with the hole 9 at its uppermost end.

Instead of making the jaw 1 as a housing with a front wall, a back wall 1e,1d and two side walls 1b,1c, the jaw can consist of a plate (not shown) having a clamp opening 1a and with the aforementioned elements such as the ratchet arm 3 and the locking member 2 positioned on the plate. The same applies also to the attaching members 6,7 for securing the clamp to the support structure.

Instead of a resilient locking member 2, the engaging portion of the ratchet arm 3 can be arranged resiliently so that upon pivoting down towards the fixed locking member 2, the engaging end 3b will give way to, for example, a telescopic device on the ratchet arm 3 such that the engaging end 3b is pressed to abutment against the locking member 2 having teeth 2a.

Figure 9:
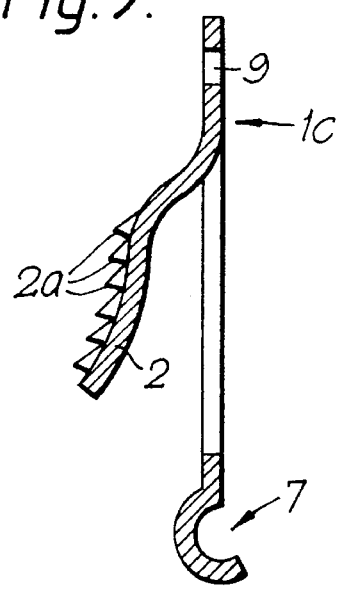
FIG. 9 illustrates a second embodiment of the side wall element comprising the locking member for the ratchet arm, the locking member constituting a portion punched out of the side wall element which, in the mounted position, projects into the jaw/housing.
Figure 10:
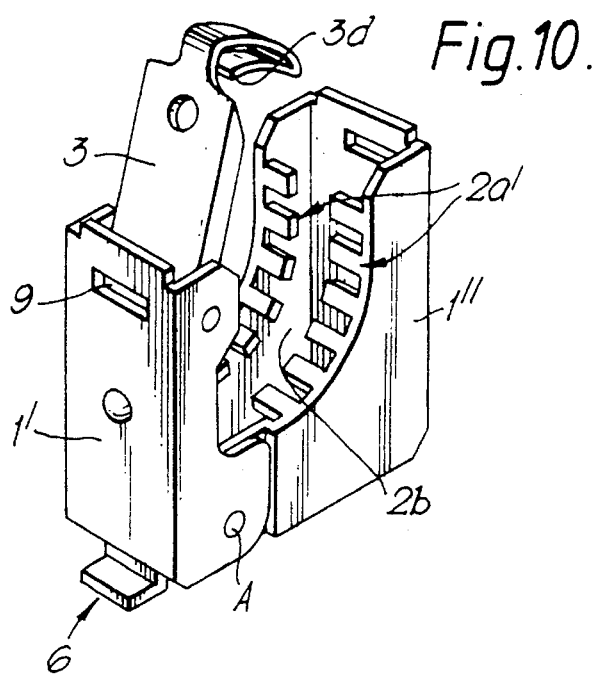
FIG. 10 shows an alternative design of the clamp of the fixing device, in perspective, where the jaw comprises two jaw portions which are rotatable in relation to one another so that upon rotating the jaw portions relative to one another, the distance between the attaching members is altered.

An alternative embodiment of the locking member 2 may be that it is made of a punched-out portion of one side wall 1c of the jaw 1, as is shown in FIG. 9. The punched-out portion here has been pivoted inwards in the jaw or the housing formed thereby in order to interact with the ratchet arm 3. The desired resilience arises in that the locking member 2 acts as a resilient arm attached to the side wall 1c. The parts are preferably made of stainless steel, thereby also having resilient properties.

In an alternative embodiment of the clamp as shown in FIGS. 10 to 16b, the two oppositely positioned side parts of the clamp opening 1a are made of two jaw portions 1', 1" that are rotatable relative to one another with the point of rotation A at the lower edge of the clamp opening 1a. This means that the jaw 1 consists of two jaw portions 1', 1" that are rotatable relative to one another. Upon relative rotation of the jaw portions 1', 1", the distance between the attaching members 6,7 is altered such that these can be inserted into the apertures 13 in the cableway/cable riser 14 in order thereafter to cause engagement between the hook-shaped attaching members 6,7 and the edges of the apertures 13 by rotating the jaw portions 1', 1" back into the operative position. The jaw portions 1', 1" can be retained in the operative position by means of the clamping members of the clamp, viz, the ratchet arm 3 and the locking member 2 which, when in engagement with one another, press the jaw portions 1', 1" towards and away from one another, respectively, in order to hold the hook-shaped attaching members 6,7 in engagement with the edges of the apertures 13.

As shown in FIGS. 10, 11 and 12a–12d, the hook openings 6a,7a of the hook-shaped attaching members 6,7 face away from one another.

In this case, the jaw portions 1', 1" will be rotated apart from one another to reduce the distance between the attaching members 6,7 for insertion into the apertures 13. Thereafter the law portions 1', 1" are rotated once more towards one another whereby the hook openings of the attaching members 6,7 are brought to abutment and engagement with the edges of the apertures 13.

In another embodiment of the attaching members 6,7, the hook openings thereof can face towards one another as is shown in FIGS. 13 and 14a–14c. On mounting the clamp on the support structure, the jaw portions 1', 1" must be rotated towards one another in order to increase the distance between the attaching members 6,7, whereupon these members are inserted into the apertures 13, whereafter the jaw portions 1', 1" are rotated back to the operative position whereby the hook openings 6a,7a of the attaching members 6,7 are brought into engagement with the side edges of the apertures 13.

Here, the jaw portions 1', 1" can also be held in the operative position by means of the ratchet arm 3 and the locking member 2 in that the ratchet arm 3 is brought into engagement with the locking member 2 and presses the jaw portions 1', 1" apart from one another.

As shown in FIGS. 12a–12d and FIGS. 14a–14c, respectively, and also in FIG. 16, the clamping members are made of complementary closure members 15,16 provided on each jaw portion 1', 1".

The complementary closure members 15,16 can, as shown in FIGS. 12a–12d and FIGS. 14a–14c, be made of a projection/tongue 15 on the first jaw portion 1' and an indentation/aperture 16 on the second jaw portion 1", or vice versa.

Thus, in FIG. 12a–12d, the tongue 15 of the closure member is made of a resilient projection/laminate spring attached to the side wall of the jaw portion 1' and which in the closed position engages with an indentation 16 in the second jaw portion 1". The indentation is positioned on the end of the jaw portion 1" which extends from the point of rotation A towards the side edge of the first jaw portion 1'. Thus, the jaw portions 1', 1" are prevented from rotating back and becoming disengaged from the apertures 13.

An alternative embodiment of the closure members 15,16 is shown in FIG. 14a–14c and in more detail in FIG. 15. The projection/tongue 15 of the closure member is here positioned on the side wall of the jaw portion 1' and projects inwards in order to interact with an indentation/aperture 16 on the second jaw portion 1". The indentation/aperture 16 is placed in the same area as mentioned above in connection with the embodiment in FIG. 12. As shown in the enlarged detailed drawings in FIGS. 15a, b and c, the part of the jaw portion 1" near the indentation/aperture 16 is furnished with a pocket 17 with an upwardly facing opening designed for the insertion of, for example, a screw driver 18. By turning the screw driver, the side wall of the jaw portion 1" is pressed so that the indentation/aperture 16 disengages from the tongue 15 of the projection/tongue 15 of the first jaw portion 1', whereby the jaw portions 1', 1" can rotate freely relative to one another, thereby causing the attaching members 6,7 of the clamp to disengage from the edges of the apertures 13 when dismounting the clamp.

In the alternative embodiment of the clamp according to FIGS. 10, 11, 12a–12d, 13, 14a–14c and 15, the locking member 2 in the jaw portion 1" is made of two parallel arcuate rows of teeth 2a' spaced relative to one another, each affixed to one of the facing side walls of the jaw portion 1" for engagement with the engaging end 3b of the ratchet arm 3.

Figure 12A:
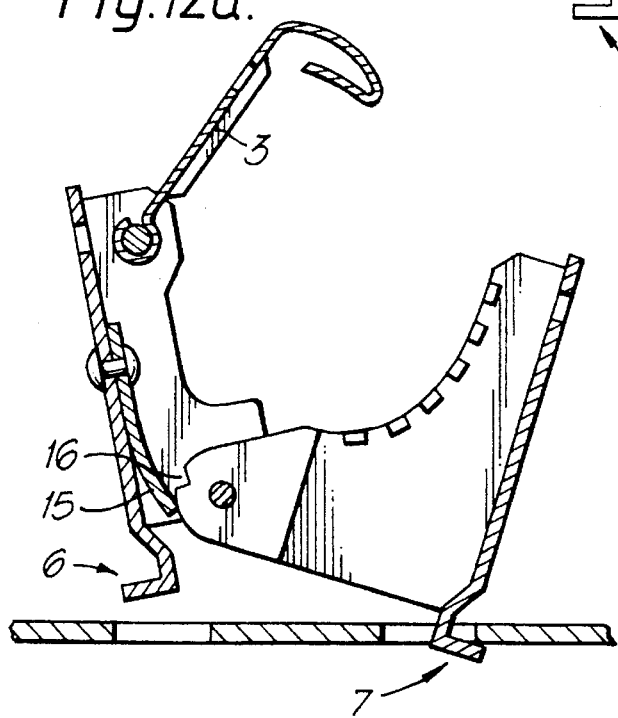
FIGS. 12a–d show the fixing device of FIGS. 10 and 11 seen from the side, in section, and where.
Figure 12B:
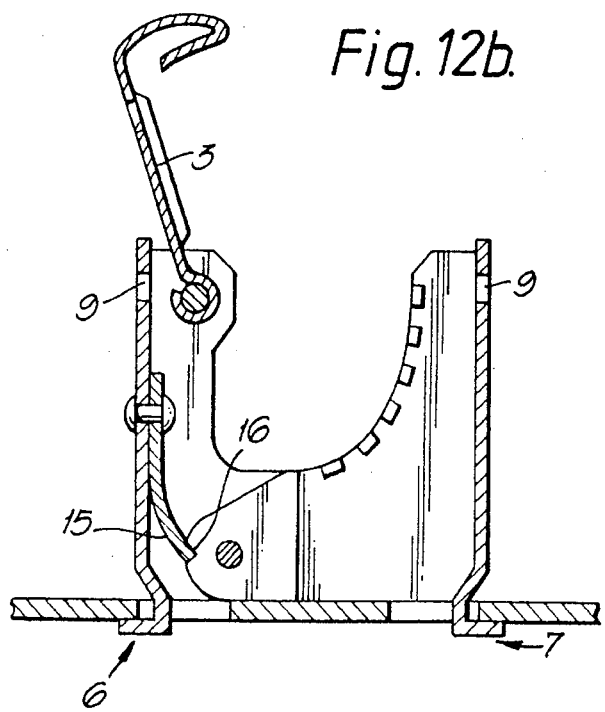
Figure 12C:
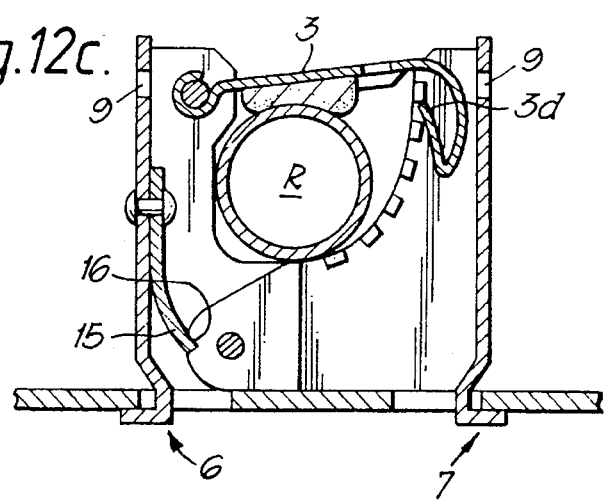
Figure 12D:
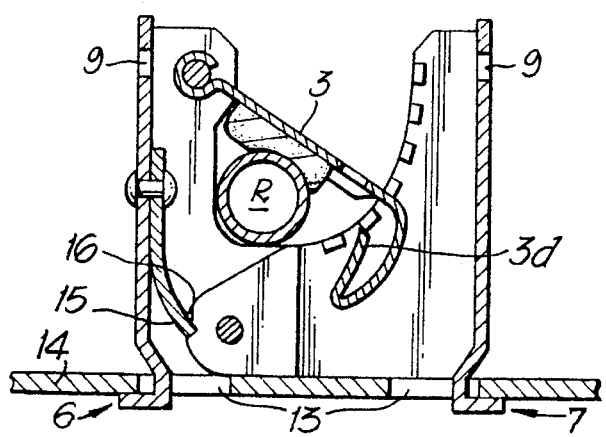

Rotation of the jaw portions 1',1" towards one another is achieved in that the engaging end 3b of the ratchet arm 3 projects in through the slot 2b formed by the rows of teeth 2a' for resilient engagement by means of the engaging members 3d provided on the engaging end with the back of the toothed rows 2a, ie, the sides which face away from the clamp opening 1a. The retention of the attaching members 6,7 in the cableway/cable riser 14 is thereby achieved at the same time as conduit R is held in the clamp as shown in FIGS. 12c and 12d, in particular. In this case,the clamping members 15,16 may therefore be omitted.

The teeth in the rows of teeth 2a' can be provided in that the side walls of the jaw portion 1" are made of plates having a number of projections chat are bent inwards at an angle to the plate whereby the two rows of teeth 2a' are produced having an intermediate slot 2b.

The resilient engagement of the ratchet arm 3 with the rows of teeth 2a' can be achieved, for example, in that the ratchet arm 3 is made of a resilient material which brings the engaging members 3d of the engaging end 3b into pressured abutment against the back of the rows of teeth 2a. Optionally, the engaging member itself 3d can be made of a resilient material in order to achieve the above described effect. The jaw 1, the jaw halves 1', 1", respectively, have at their side edges on each side of the mouth of the clamp opening 1a a hole 9 for interaction with the aforementioned hook-shaped attaching members 6,7 on a corresponding clamp, for mounting clamps one on top of another, as shown in FIG. 16a. Mounting the clamp in the hole 9 of the underlying clamp happens in the same way as described hereinabove in connection with both clamps having a nondivided jaw 1 and clamps wherein the jaw 1 comprises two jaw portions 1',1", rotatable relative to one another.

Figure 11:
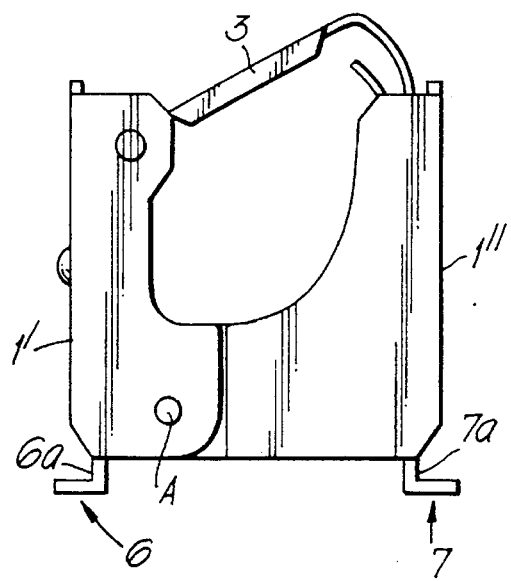
FIG. 11 shows the fixing device of FIG. 10 seen from the side.

As also shown in the drawing, and particularly clearly in FIG. 16a, the axis of rotation A of the jaw portions 1', 1" is laterally displaced from the bisectional plane B of the clamp opening 1a, see FIG. 11, and inwards above one of the jaw portions 1',1" . The point of rotation A is preferably displaced inwards above jaw component 1' with ratchet arm 3.

I claim:

1. A device for securing an elongate article to a support structure which has at least two apertures having a given spacing from one another, said device comprising:

a U-shaped jaw;

a ratchet arm pivotally supported at one end thereof to said jaw for movement between an open position, in which the U-shaped jaw is open for insertion and removal of an elongate article, and a closed position, in which the U-shaped jaw is obstructed by the ratchet arm so as to prevent insertion and removal of an elongate article;

a series of locking means provided on said jaw;

said ratchet arm at an opposite end thereof from said one end including a feature arranged for selective releasable snap engagement with respective ones of said locking means, for retaining an elongate article in said jaw despite variation, within a range, in transverse dimension of the elongate article;

said jaw further including at least two attaching hook members, and means actuable for moving said hook members relatively towards and away from one another between one position in which the hook members can be inserted and removed from respective apertures of the support structure, and another position in which the hook members if already received in said apertures, cannot be removed therefrom;

said jaw further including structure arranged to prevent the hook members from being moved from said other position to said one position, while said hooks are received in said apertures, unless said jaw is open.

2. The fixing device of claim 1, wherein:

said two hook members project towards one another and said means actuable for moving are arranged to move said two hook members away from one another to achieve said other position from said one position.

3. The fixing device of claim 1, wherein:

said two hook members project away from one another and said means actuable for moving are arranged to move said two hook members towards one another to achieve said other position from said one position.

4. The fixing device of claim 1, further including:

said jaw including a body;

said series of locking means being provided on a locking member; and means resiliently mounting said locking member on said body so as to urge said locking means towards said opposite end of the ratchet arm.

5. The fixing device of claim 1, further including:

means for resiliently urging said feature arranged on the opposite end of said ratchet arm for releasable snap engagement with respective ones of said locking means, into engagement with respective ones of said locking means when said feature is engaged with respective ones of said locking means.

6. The fixing device of claim 1, wherein:

at least one of said series of locking means and said feature arranged for selective releasable snap engagement with respective ones of said locking means, is provided as teeth.

7. The fixing device of claim 4, wherein:

said locking member is elongated; and said means resiliently mounting said locking member act on said locking member towards an end of said locking member, for causing said locking member to tend to obstruct said jaw.

8. The fixing device of claim 4, wherein:

said locking device is movably mounted to said body by a pin and slot arrangement; and said means resiliently mounting said locking member on said body biases said locking member, on said pin and slot arrangement, so as to cause said locking member to tend to obstruct said jaw.

9. The fixing device of claim 1, wherein:

said jaw includes a body; and of said two attaching hook members, one is fixed to said body and the other is movably mounted to said body.

10. The fixing device of claim 9, further comprising a lever-operated cam mounted on said body for engagement with said other of said hook members, for urging and locking said other of said hook members so as to dispose said hook members in said other position.

11. The fixing device of claim 10, wherein:

said lever-operated cam provided at least part of said structure arranged to prevent said hook members from being moved from said other position to said one position.

12. The fixing device of claim 1, wherein:

said jaw includes a body having two portions, respective of said hook members being provided on respective of said body portions; and said body portions being pivotally secured to one another for providing said means actuable for moving said hook members relatively towards and away from one another.

13. The fixing device of claim 12, wherein:

said structure arranged to prevent the hook members from being moved is provided at least in part on said body.

14. The fixing device of claim 12, wherein:

said structure arranged to prevent the hook members from being moved is cooperatively provided on said body portions and is arranged to be activated upon movement of said ratchet arm to said closed position.

15. The fixing device of claim 14, wherein:

said structure comprises a projection provided on one of said body portions, and an indentation provided on another of said body portions, for receiving said projection.

16. The fixing device of claim 1, wherein:

said jaw comprises a pair of side walls; and said series of locking means is provided as two arcuate rows of teeth, one provided on each of said side walls.

17. The fixing device of claim 16, wherein:

said rows are spaced apart so as to define a slot;

said ratchet arm, between said ends thereof, is arranged to enter and move in said slot;

said rows of teeth have a convex rear side; and said feature on said opposite end of said ratchet arm is arranged to engage said teeth from said convex rear side of said rows of teeth.

18. The fixing device of claim 1, wherein:

said jaw includes a body; and said body includes two apertures located thereon distally of said hooks, for reception of hooks of a like second fixing device, for mounting the like second fixing device thereon.

19. The fixing device of claim 12, wherein:

said series of locking means has an outer end corresponding to a largest diameter securable elongate article;

said body portions are so pivotally secured to one another as to be pivotable about an axis which is parallel to a ratchet arm pivot axis about which said ratchet arm pivots when moving between said open and closed positions, and is closer to said ratchet arm pivot axis than to said outer end of said locking means.

* * * * *